United States Patent
Holecek et al.

(10) Patent No.: US 10,851,690 B2
(45) Date of Patent: Dec. 1, 2020

(54) INTERNAL COMBUSTION ENGINE WITH A TURBO CHARGER UNIT

(71) Applicant: INNIO Jenbacher GmbH & Co OG, Jenbach (AT)

(72) Inventors: Jakub Holecek, Tirol (AT); Guenther Wall, Tirol (AT)

(73) Assignee: INNIO JENBACHER GMBH & CO OG, Jenbach (AT)

(*) Notice: Subject to any disclaimer, the term of this patent is extended or adjusted under 35 U.S.C. 154(b) by 0 days.

(21) Appl. No.: 16/192,371

(22) Filed: Nov. 15, 2018

(65) Prior Publication Data

US 2020/0157986 A1 May 21, 2020

(30) Foreign Application Priority Data

Nov. 23, 2017 (EP) .................... 17203254

(51) Int. Cl.
| | | |
|---|---|---|
| *F01M 13/04* | (2006.01) | |
| *F02M 25/06* | (2016.01) | |
| *B01D 45/08* | (2006.01) | |
| *B01D 45/12* | (2006.01) | |
| (Continued) | | |

(52) U.S. Cl.
CPC .............. *F01M 13/04* (2013.01); *B01D 45/08* (2013.01); *B01D 45/12* (2013.01); *F01M 2013/0083* (2013.01); *F01M 2013/026* (2013.01); *F01M 2013/027* (2013.01); *F01M 2013/0422* (2013.01); *F02M 25/06* (2013.01)

(58) Field of Classification Search
CPC ........... F01M 13/04; F01M 2013/0083; F01M 2013/0422; F01M 2013/026; F01M 2013/027; F02M 25/06; F02D 2250/08; B01D 45/08; B01D 45/12
See application file for complete search history.

(56) References Cited

U.S. PATENT DOCUMENTS

| | | | |
|---|---|---|---|
| 3,978,671 | A | 9/1976 | Gonzalez |
| 4,679,992 | A | 7/1987 | Watanabe et al. |
| 7,100,587 | B2 | 9/2006 | Ahlborn et al. |

(Continued)

FOREIGN PATENT DOCUMENTS

| | | |
|---|---|---|
| CN | 201173151 U | 12/2008 |
| CN | 203321907 U | 12/2013 |

(Continued)

OTHER PUBLICATIONS

Machine translation of Detailed Description, JP2005264917A, Yokoyama, publ'n date Sep. 29, 2005, obtained from https://worldwide.espacenet.com/, pp. 1-19 (Year: 2005).*

(Continued)

*Primary Examiner* — Grant Moubry
(74) *Attorney, Agent, or Firm* — Fletcher Yoder, P.C.

(57) ABSTRACT

An internal combustion engine, such as a stationary reciprocating piston engine, is provided. The internal combustion engine includes at least one turbo charger unit. At least one supply conduct is configured to convey a medium from the at least one turbo charger unit to at least one separation device, which is configured to separate foreign substances, in particular oil, from the medium. At least one foreign substance conduct is configured to convey the separated foreign substances from the at least one separation device to at least one crankcase.

20 Claims, 3 Drawing Sheets

(51) Int. Cl.
*F01M 13/00* (2006.01)
*F01M 13/02* (2006.01)

(56) References Cited

U.S. PATENT DOCUMENTS

| | | | |
|---|---|---|---|
| 8,205,603 | B2 | 6/2012 | Johnson |
| 8,695,339 | B2 | 4/2014 | Spix |
| 9,540,975 | B2* | 1/2017 | Wall ........................ B01D 45/08 |
| 2011/0146638 | A1 | 6/2011 | Wada |
| 2013/0199506 | A1 | 8/2013 | Fernandez |
| 2014/0326225 | A1 | 11/2014 | Shioda et al. |
| 2014/0352539 | A1 | 12/2014 | Schleiden et al. |
| 2015/0361839 | A1 | 12/2015 | Kimura et al. |
| 2018/0023428 | A1* | 1/2018 | Ishida ................ F01M 13/0416 55/323 |

FOREIGN PATENT DOCUMENTS

| | | |
|---|---|---|
| DE | 202006009537 U1 | 6/2007 |
| DE | 102010012118 A1 | 9/2011 |
| EP | 1065350 A2 | 1/2001 |
| EP | 1065350 A3 | 2/2002 |
| EP | 1771643 B1 | 10/2007 |
| JP | 2005264917 A | 9/2005 |
| WO | 200980521 A1 | 7/2009 |
| WO | 2015044242 A1 | 4/2015 |

OTHER PUBLICATIONS

European Search Report and Written Opinion dated May 22, 2018 which was issued in connection with EP patent application No. 17203254.2 which was filed on Nov. 23, 2018.

* cited by examiner

INTERNAL COMBUSTION ENGINE WITH A TURBO CHARGER UNIT

BACKGROUND OF THE DISCLOSURE

This invention relates to an internal combustion engine, a stationary reciprocating piston engine with the features of the preamble of claim 1.

Internal combustion engines having a crankcase known from the state of the art have a crankcase ventilation system. This crankcase ventilation system is processing the gases from the crankcase of an internal combustion engine in a controlled manner.

This is necessary because internal combustion inevitably involves/produces a small but continued amount of blow-by gas, which occurs when some of the gases from the combustion leak past the piston rings and thereby reach the inside of the crankcase, causing pressure to build up in the crankcase. To avoid this, blow-by gases (which include unburned hydrocarbons and combustion products) have to be discharged from the crankcase. The ideal pressure for the crankcase in normal operation is slightly negative (about −2 to −20 mbar) relative to ambient pressure.

If the internal combustion engine comprises at least one turbo charger further blow by is generated by the turbo charger. In this case the air/compressed air of the compressor unit and an exhaust gas from the turbine unit of the turbo charger leak past the bearings of the turbo charger. A known measure to deal with the turbo charger blow-by is to collect the medium (blow-by gas) passing by the bearings in the turbo charger housing and convey it to the at least one crankcase. The medium is carrying fluid and/or solid foreign substances, which are entrained by the compressed air and the exhaust gas along its flow path. The foreign substances can for example comprise lubrication droplets from the lubrication of the turbo charger bearings.

BRIEF DESCRIPTION OF THE DISCLOSURE

It is the object of the invention to provide an internal combustion engine with improved characteristics regarding a crankcase ventilation system and/or lifetime of used lubrication fluids.

This object is being accomplished by an internal combustion engine having the features of claim 1. In the embodiments of the invention are defined in the dependent claims.

This object is accomplished according to the invention by an internal combustion engine comprising at least one turbo charger unit, wherein there is provided at least one supply conduct, configured to convey a medium from the at least one turbo charger unit to at least one separation device, which is configured to separate foreign substances, in particular oil, from the medium, and at least one foreign substance conduct configured to convey the separated foreign substances from the at least one separation device to the at least one crankcase.

With the help of such a separation device the medium conveyed to the at least one crankcase can be separated from fluid and/or solid foreign substances before it enters the crankcase.

Experiments of the applicant showed that the particle/oil droplet content in the medium flow from the turbo charger is specifically high compared to the medium flow in the crankcase ventilation system. By a reduction of particle/oil droplet load in this medium flow to the crankcase the amount of particle/oil droplets to be processed by the crankcase ventilation system can be reduced. This will lead to an improvement in the performance of the crankcase ventilation system and an increase in separator lifetime.

For the purposes of this document the crankcase is that part of the engine block which houses the crankshaft.

The foreign substances separated from the medium can be fluid, in particular liquid, and/or solid. Examples would be droplets of lubrication or particles of combusted material.

It can be provided that the at least one separation device comprises an inertial separator—a centrifugal separator and/or impact separator. These types of separators are separating liquid and/or fluid foreign substances from a gas by the use of gravity and/or inertia. Also other embodiments of gravity and/or inertia separators (e.g. oil trap, cyclone separator) can be used.

It can also or additionally be provided that the at least one separation device comprises a filter device, in an embodiment a coalescence filter, and/or a metal mesh separator.

It is provided that the at least one foreign substance conduct leads into the at least one crankcase below a level of lubrication fluid. This section of the crankcase is also called oil pan. With the help of at least one foreign substance conduct leading to the at least one crankcase below a level of lubrication fluid foreign substances can be conveyed separately from the remaining gaseous flow to the at least one crankcase. This avoids the mixing of the already separated remaining gaseous flow with fluid and/or solid foreign substances.

It can be provided that at least one remainder conduct is provided, which is configured to convey the remaining gaseous flow stemming from the separation of the foreign substances from the medium to the at least one crankcase of the internal combustion engine, above the level of lubrication fluid. With the help of at least one remainder conduct leading to the at least one crankcase above a level of lubrication the remaining gaseous flow can be conveyed separately from the separated foreign substances to the at least one crankcase. This avoids the mixing of the already separated gaseous flow with the separated fluid and/or solid foreign substances. If with the help of the remainder conduct separated gaseous flow of the medium is conveyed to the crankcase above a level of lubrication fluid a further unnecessary mixing from the charge air with the lubrication fluid in the at least one crankcase can be avoided.

It can be provided that the remaining gaseous flow conveyed to the at least one crankcase is introduced at the at least one crankcase
- essentially horizontally and/or
- pointing away from a level of lubrication fluid present in the at least one crankcase and/or
- directed onto a baffle plate 13 (see FIGS. 1 and 3), which baffle plate 13 is essentially parallel to a level of lubrication fluid present in the at least one crankcase.

With the help of this the remaining gaseous flow conveyed to the at least one crankcase can be prevented from mixing with the lubrication fluid present at the at least one crankcase.

With the described features, the separation device in the medium flow of the turbo charger, the separate conducts to convey remainder gas flow and foreign substances and the specific way of introducing the remaining gas flow to the crankcase the contact surface of gaseous medium with foreign substances/lubricating oil can be reduced significantly.

The contact of lubricating oil with crankcase gases is known to impact oil degradation and lubricating oil lifetime.

It can desirably be provided that a return conduct is provided for conveying the gaseous flow after passing through the crankcase to an air intake conduct, wherein the air intake conduct provides the turbo charger with air, or to a gas mixer. A gas mixer could be provided in this case in an air intake conduct before a turbo charger unit, seen in a flow direction of an intake air.

In an embodiment of the invention a further separation device is provided between the return conduct and the at least one crankcase and/or in the return conduct, separating fluid and/or solid foreign substances from the gaseous current coming from the at least one crankcase. It can also or additionally be provided that a coalescence filter is provided between the return conduct and the at least one crankcase and/or in the return conduct.

It can be provided that at least one remainder conduct is provided, wherein with the help of this remainder conduct remaining gaseous flow or the complete gas flow stemming from the separation of the foreign substances from the medium can be conveyed to the turbo charger and/or a gas mixer and/or a coalescence filter.

In an embodiment of the invention a gas mixer can be provided, mixing at least one fuel, natural gas, with air, wherein the gas mixture is conveyed to the turbo charger unit.

In another embodiment of the present invention it can be provided that the at least one turbo charger unit charges air and that a charge air conduct conveys the charged air to at least one combustion chamber, wherein an injection unit injects a fuel directly to the at least one combustion chamber.

The invention can be used in connection with all internal combustion engines, especially in connection with stationary reciprocating internal combustion engines.

The invention can especially be used for internal combustion engine, which have no additional air supply for the at least one crankcase. This means the crankcase ventilation system is only supplied with the blow-by gas (gases from the combustion leak past the piston rings) and the blow-by turbo gas (gases leak past the bearings of the turbo charger). For this case no separate air supply is provided to ventilate the at least one crankcase with ambient air.

Further the details will be apparent from the drawing and the specific description relating thereto.

DETAILED DESCRIPTION

Figure 1:
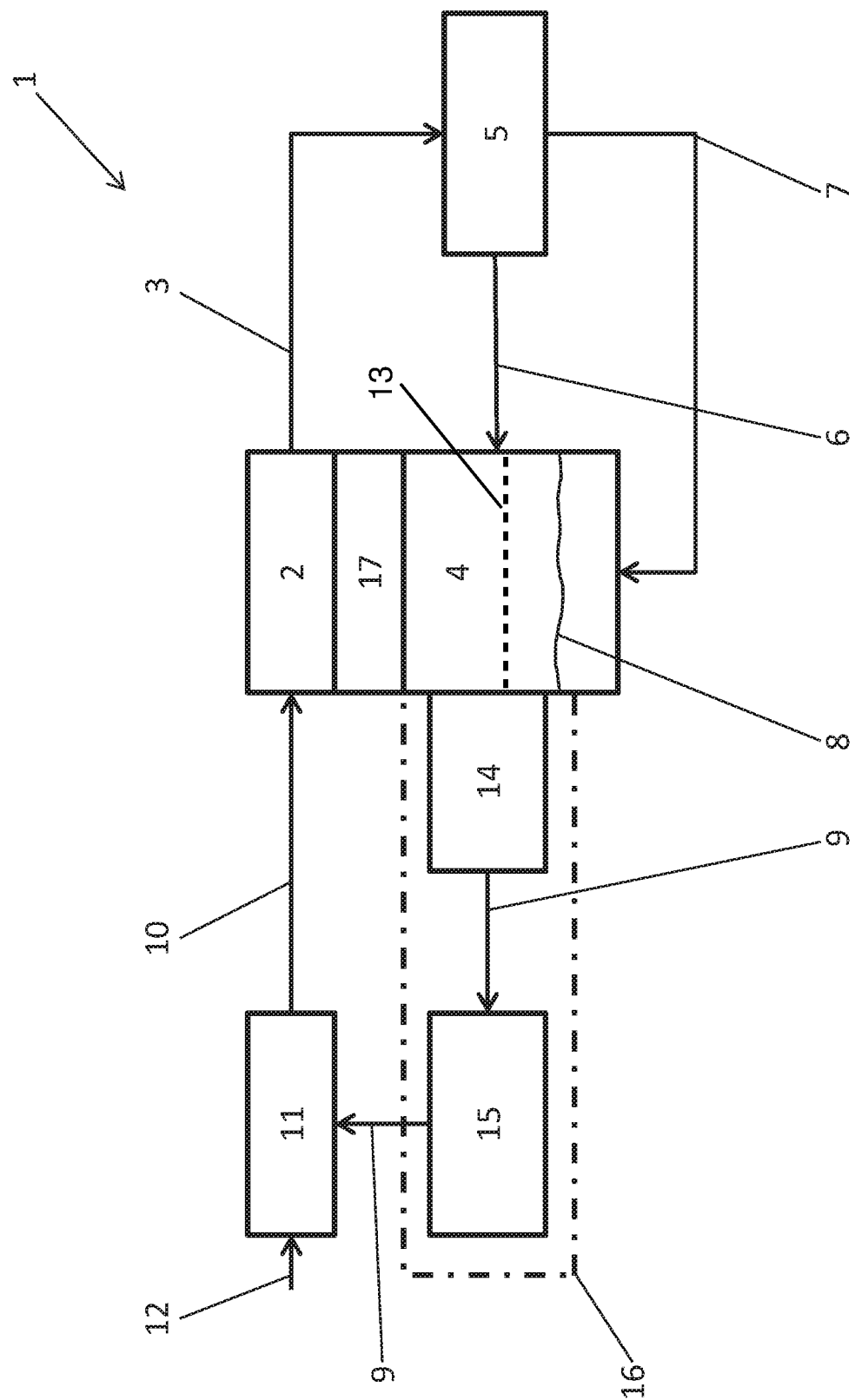
FIG. 1 shows an embodiment of an inventive internal combustion engine 1.

FIG. 1 shows an embodiment of an inventive internal combustion engine 1. This internal combustion engine 1 comprises a turbo charger unit 2, which is connected to at least one combustion chamber 17 of the internal combustion engine 17, supplying charged air to the at least one combustion chamber 17. The combustion chamber 17 is arranged at or in a crankcase 4 of the internal combustion engine 1. Inside the crankcase 4 a lubrication fluid is present at a certain (filling) level of lubrication fluid 8. For conveying blow-by turbo gases to the crankcase the blow-by gases leaking passed the bearings of the turbo charger unit 2 are collected by the turbo charger unit 2 housing. A supply conduct 3 is used, connecting the turbo charger unit 2 with the crankcase 4 for leading this collected medium to the crankcase 4. This medium may comprise blow-by gases, lubrication droplets, solid foreign substances, fluid foreign substances and exhaust gases. Additional blow-by gases from the combustion chamber are conveyed to the crankcase by leading past the piston rings.

According to the invention a separation device 5 is provided, which is configured to separate fluid and/or foreign substances, in particular oil, from the medium conveyed to the crankcase 4. This separation device 5 can comprise a centrifugal separator and/or an impact separator and/or a filter device and/or a coalescence filter.

After passing the separation device 5 the separated medium is conveyed by a foreign substance conduct 7 and a remainder conduct 6 to the crankcase 4. The remainder conduct 6 is conveying the remaining gaseous flow stemming from the separation of the foreign substances from the medium to the crankcase 4 above the lubrication level 8. The foreign substance conduct 7 is conveying the separated fluid and/or solid foreign substances to the crankcase 4 below the lubrication level 8.

A return conduct 9 is provided for conveying the separated gaseous current after passing the crankcase to the intake conduct 10. In this return conduct 9 the crankcase 4 ventilation system 16 is integrated. The crankcase 4 ventilation system 16 comprises a further separation device 14, which is arranged next to the crankcase 4, separating solid and/or fluid foreign substances from the gaseous current included by the gaseous current during the passing of the crankcase 4. Further the crankcase 4 ventilation system 16 comprises a coalescence filter 15 to filter further solid and/or fluid foreign substances from the gaseous current.

The gaseous current coming from the crankcase 4 ventilation system 16 is conveyed to an air intake and gas mixer 11. This air intake and gas mixer 11 sucks ambient air 12 and filters it with the help of a filter device (not shown). After filtering the ambient air 12, the air is mixed with at least one fuel used for a combustion inside the at least one combustion chamber 17. The prepared gas mixture is conveyed by the air intake conduct 10 to the turbo charger unit 2 of the internal combustion engine 1.

Figure 2:
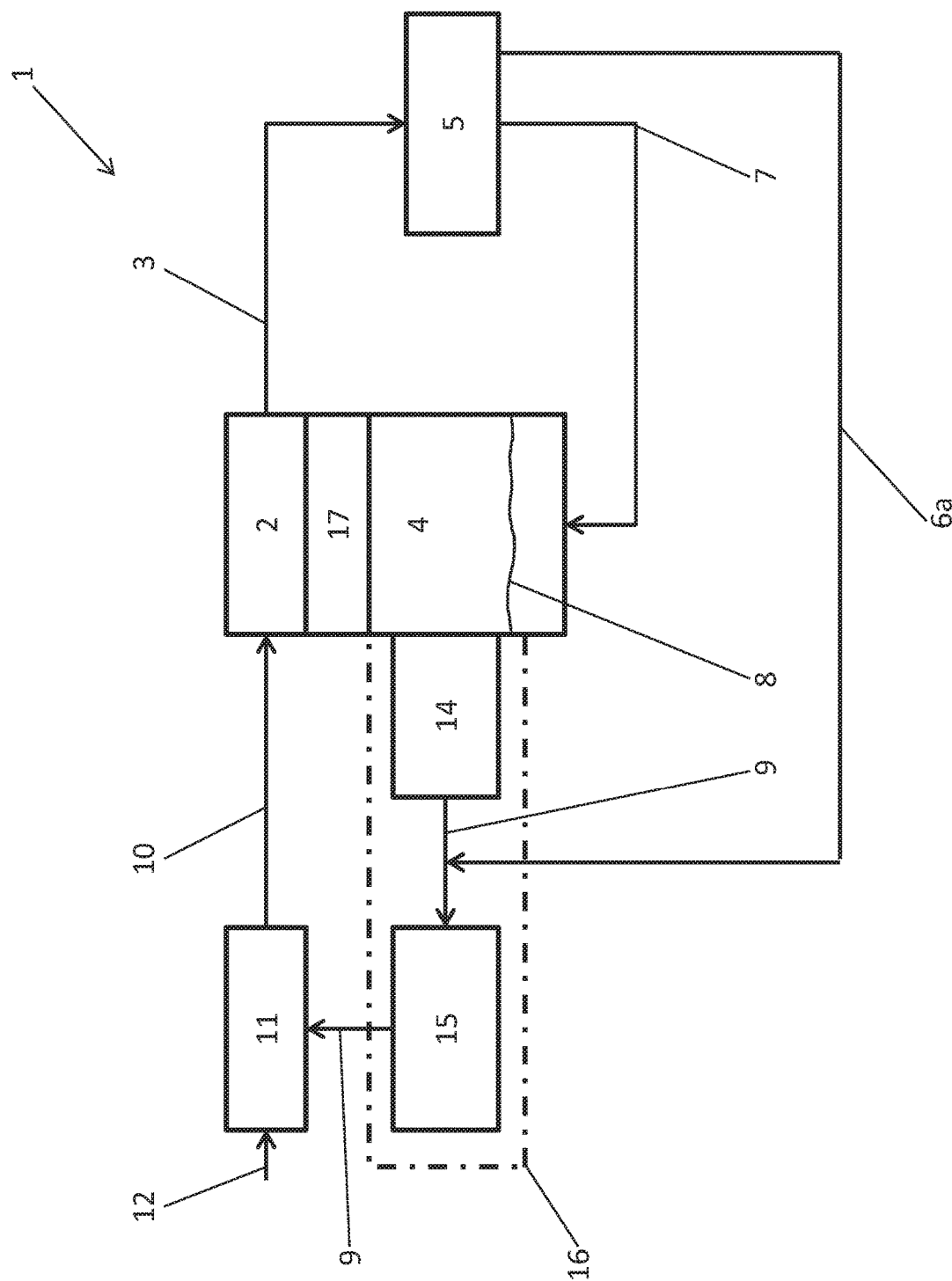
FIG. 2 shows a further embodiment comprising a remainder conduct.

FIG. 2 comprises a further embodiment of the invention. Differing from FIG. 1 in the embodiment of FIG. 2 a remainder conduct 6a is provided connecting the separation device 5 with a coalescence filter 15. With the help of this alternative remainder conduct 6a a remaining gaseous flow stemming from the separation of the foreign substances from the medium can be conveyed to a coalescence filter 15 by bypassing the crankcase. Apart from the remainder conduct 6a the embodiment of FIG. 2 is identical to FIG. 1.

Figure 3:
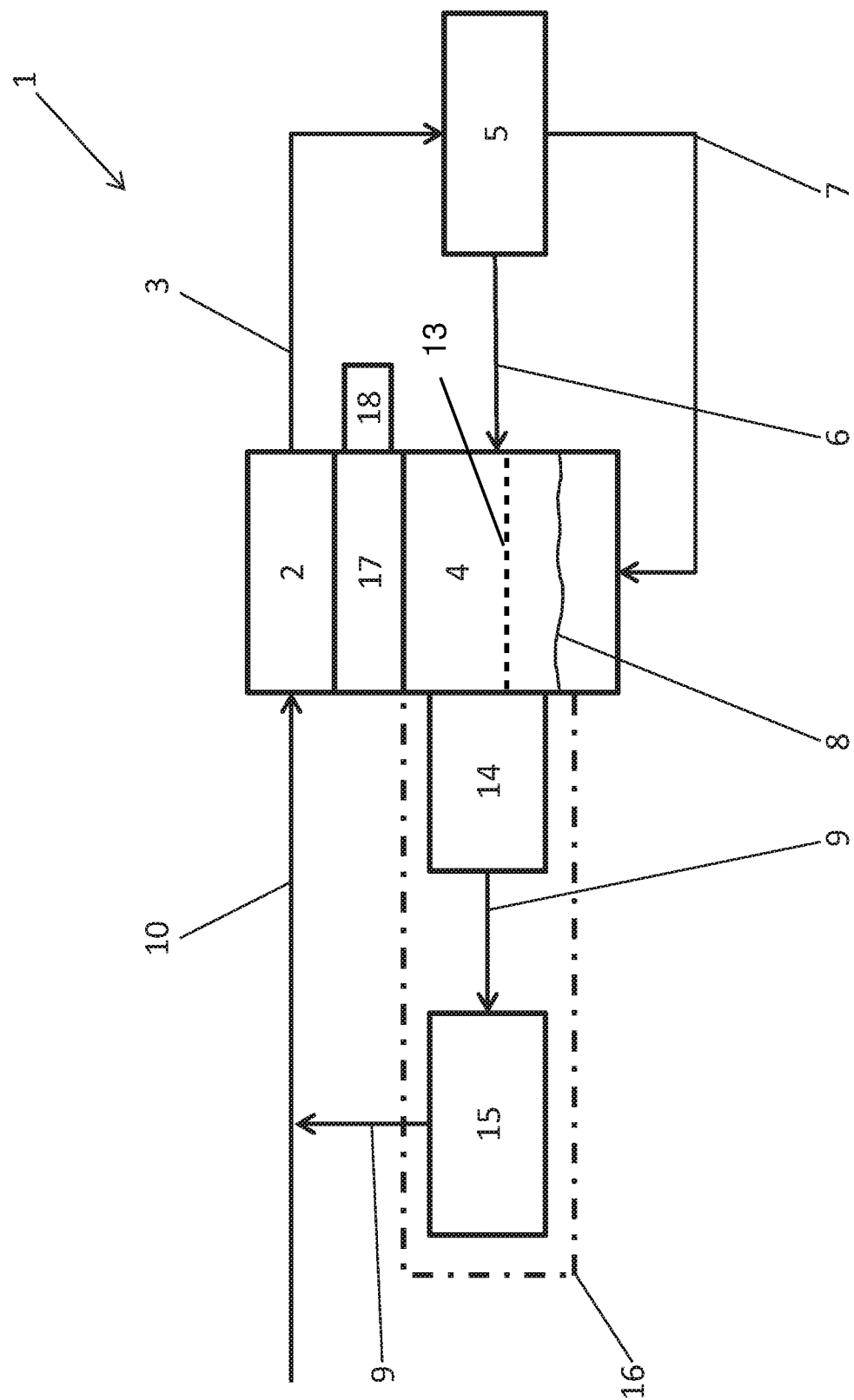
FIG. 3 shows and embodiment comprising a turbo charged internal combustion engine.

The embodiment of FIG. 3 comprises a turbo charged internal combustion engine 1 having a direct injection system. The turbo charger unit 2 sucks ambient air 12 through the air intake conduct 10. The turbo charger unit 2 charges the ambient air and conveys the charged air directly to the at least one combustion engine 17. The fuel for the combustion is injected directly into the combustion chamber 17 by the injection unit 18. The injected fuel and the charged air are mixed inside of the at least one combustion chamber 17. The return conduct 7, shown in this embodiment, is arranged between the crankcase ventilation system 16 and the air intake conduct 10.

The invention claimed is:
1. An internal combustion engine comprising:
at least one turbo charger unit with at least one supply conduit; the at least one supply conduit configured to convey a medium from the at least one turbo charger unit to at least one separation device; the at least one separation device configured to separate foreign substances and a remaining gaseous flow from the medium;

at least one foreign substance conduit configured to convey the foreign substances from the at least one separation device into at least one crankcase; and at least one remainder gas conduit configured to convey the remaining gaseous flow from the at least one separation device into the at least one crankcase.

2. The internal combustion engine according to claim 1, wherein the at least one separation device comprises an inertial separator.

3. The internal combustion engine according to claim 1, wherein the at least one separation device comprises a filter device.

4. The internal combustion engine according to claim 1, wherein the at least one foreign substance conduit is configured to convey the foreign substances into the at least one crankcase below a level of lubrication fluid.

5. The internal combustion engine according to claim 1, wherein the at least one remainder gas conduit is configured to convey the remaining gaseous flow into the at least one crankcase above a level of lubrication fluid.

6. The internal combustion engine according to claim 5, wherein the remaining gaseous flow conveyed to the at least one crankcase is introduced at the at least one crankcase:
   horizontally and/or
   pointing away from the level of lubrication fluid present in the at least one crankcase and/or
   directed onto a baffle plate is oriented parallel to the level of lubrication fluid present in the at least one crankcase.

7. The internal combustion engine according to claim 1, wherein a return conduit is configured to convey a gaseous flow from the at least one crankcase to an air intake conduit fluidly coupled to the turbo charger unit.

8. The internal combustion engine according to claim 7, wherein a further separation device is disposed between the return conduit and the at least one crankcase and/or in the return conduit, wherein the further separation device is configured to separate fluid and/or solid foreign substances from the gaseous flow coming from the at least one crankcase.

9. The internal combustion engine according to claim 7, wherein a coalescence filter is disposed between the return conduit and the at least one crankcase and/or in the return conduit.

10. The internal combustion engine according to claim 1, wherein the at least one remainder gas conduit is configured to convey the remaining gaseous flow from the at least one separation device into the at least one crankcase in a direction away from a level of lubrication fluid present in the at least one crankcase.

11. The internal combustion engine according to claim 1, wherein the at least one remainder gas conduit is configured to convey the remaining gaseous flow from the at least one separation device into the at least one crankcase onto a baffle plate.

12. The internal combustion engine according to claim 1, wherein the at least one remainder gas conduit is part of a crankcase ventilation system configured to ventilate the at least one crankcase without a separate air supply.

13. A system, comprising:
   a crankcase ventilation system configured to ventilate a crankcase of an internal combustion engine, wherein the crankcase ventilation system comprises:
     at least one separator;
     at least one supply conduit configured to convey a medium from at least one turbo charger to the at least one separator, wherein the at least one separator is configured to separate foreign substances and a remaining gaseous flow from the medium;
     at least one foreign substance conduit configured to convey the foreign substances from the at least one separator into the at least one crankcase; and
     at least one remainder gas conduit configured to convey the remaining gaseous flow from the at least one separator into the at least one crankcase.

14. The system according to claim 13, wherein the at least one foreign substance conduit is configured to convey the foreign substances into the at least one crankcase below a level of lubrication fluid, wherein the at least one remainder gas conduit is configured to convey the remaining gaseous flow into the at least one crankcase above the level of lubrication fluid.

15. The system according to claim 13, wherein the at least one remainder gas conduit is configured to convey the remaining gaseous flow from the at least one separation device into the at least one crankcase in a direction away from a level of lubrication fluid present in the at least one crankcase.

16. The system according to claim 13, wherein the at least one remainder gas conduit is configured to convey the remaining gaseous flow from the at least one separation device into the at least one crankcase onto a baffle plate.

17. A system, comprising:
   a crankcase ventilation system configured to ventilate a crankcase of an internal combustion engine, wherein the crankcase ventilation system comprises:
     a separator;
     a supply conduit configured to convey a leakage flow from at least one component of the internal combustion engine to the separator, wherein the separator is configured to separate foreign substances and a remaining gaseous flow from the leakage flow;
     a foreign substance conduit configured to convey the foreign substances from the separator into the crankcase; and
     a remainder gas conduit configured to convey the remaining gaseous flow from the separator into the crankcase.

18. The system according to claim 17, wherein the at least one component comprises one or more pistons of the internal combustion engine, a turbo charger of the internal combustion engine, or a combination thereof.

19. The system according to claim 17, wherein the foreign substance conduit is configured to convey the foreign substances into the crankcase below a level of lubrication fluid, wherein the remainder gas conduit is configured to convey the remaining gaseous flow into the crankcase above the level of lubrication fluid.

20. The system according to claim 19, wherein the remainder gas conduit is configured to convey the remaining gaseous flow from the separator into the crankcase:
   in a direction away from the level of lubrication fluid present in the crankcase; or
   onto a baffle plate in the crankcase.

* * * * *